(12) United States Patent
Wang et al.

(10) Patent No.: US 8,868,063 B2
(45) Date of Patent: Oct. 21, 2014

(54) USING PERSONAL WIRELESS DEVICES FOR NETWORK TESTING

(75) Inventors: Peter S. Wang, E. Setauket, NY (US); Janet A. Stern-Berkowitz, Little Neck, NY (US); Nobuyuki Tamaki, Manhasset, NY (US)

(73) Assignee: Interdigital Patent Holdings, Inc., Wilmington, DE (US)

( * ) Notice: Subject to any disclaimer, the term of this patent is extended or adjusted under 35 U.S.C. 154(b) by 24 days.

(21) Appl. No.: 13/094,700

(22) Filed: Apr. 26, 2011

(65) Prior Publication Data

US 2012/0108199 A1 May 3, 2012

Related U.S. Application Data

(60) Provisional application No. 61/329,215, filed on Apr. 29, 2010.

(51) Int. Cl.
- *H04W 24/00* (2009.01)
- *H04W 24/10* (2009.01)
- *H04W 4/22* (2009.01)

(52) U.S. Cl.
CPC ............. *H04W 24/10* (2013.01); *H04W 4/22* (2013.01)
USPC ............ 455/423; 455/405; 455/424; 455/425

(58) Field of Classification Search
None
See application file for complete search history.

(56) References Cited

U.S. PATENT DOCUMENTS

| | | | | |
|---|---|---|---|---|
| 5,594,949 | A * | 1/1997 | Andersson et al. | 455/437 |
| 6,574,484 | B1 * | 6/2003 | Carley | 455/521 |
| 2002/0155830 | A1 * | 10/2002 | Iyer | 455/424 |
| 2009/0047960 | A1 * | 2/2009 | Gunnarsson et al. | 455/436 |
| 2009/0170441 | A1 * | 7/2009 | Eckert et al. | 455/67.11 |
| 2009/0298527 | A1 * | 12/2009 | Chin et al. | 455/522 |
| 2010/0178935 | A1 * | 7/2010 | Jang et al. | 455/456.1 |
| 2010/0184439 | A1 * | 7/2010 | Chen et al. | 455/436 |
| 2010/0190488 | A1 * | 7/2010 | Jung et al. | 455/424 |
| 2010/0234006 | A1 * | 9/2010 | Vadlamudi | 455/418 |
| 2010/0311421 | A1 * | 12/2010 | Mach | 455/436 |
| 2011/0098042 | A1 * | 4/2011 | Mach et al. | 455/435.1 |
| 2011/0201279 | A1 * | 8/2011 | Suzuki et al. | 455/67.11 |

FOREIGN PATENT DOCUMENTS

| | | |
|---|---|---|
| JP | 2011-525326 A | 9/2011 |
| WO | WO 2009/152097 A1 | 12/2009 |

OTHER PUBLICATIONS

3rd Generation Partnership Project (3GPP), R2-096290, "TR36.805 v1.2.1 on Study on Minimization of drive-tests in next generation networks", Qualcomm Europe, 3GPP TSG-RAN WG2 meeting #67, Miyazaki, Japan, Oct. 12-16, 2009, 22 pages.

(Continued)

*Primary Examiner* — Suhail Khan
(74) *Attorney, Agent, or Firm* — Condo Roccia Koptiw LLP

(57) ABSTRACT

A personal wireless device is utilized to carry out measurements of one or more network-performance related metrics in response to a triggering event. The triggering event can be a message that is transmitted by a network element to the personal wireless device. The personal wireless device may be exemplified by a variety of personal devices such as, for example, a cellular phone, or a personal digital assistant (PDA). The measurements may be used to derive network-performance related information such as cellular signal coverage areas, signal hole areas, and signal interference areas.

39 Claims, 6 Drawing Sheets

(56) References Cited

OTHER PUBLICATIONS

3rd Generation Partnership Project (3GPP), R2-100239, "MDT Measurement Model", Orange, Telecom Italia, Deutsche Telekom, 3GPP TSG-RAN WG2 Meeting #68bis, Valencia, Spain, Jan. 18-22, 2010, 3 pages.

3rd Generation Partnership Project (3GPP), R2-101145, "In which state MDT measurement is performed", Samsung, 3GPP TSG RAN WG2 #69, San Francisco, USA, Feb. 22-26, 2010, 3 pages.

3rd Generation Partnership Project (3GPP), R2-101161, "MDT Measurement in Idle Mode for a specific area", LG Electronics Inc., 3GPP TSG-RAN2 Meeting #69, San Francisco, USA, Feb. 22-26, 2010, 1 page.

3rd Generation Partnership Project (3GPP), R2-101426, "Triggers for logged MDT measurement reporting", Ericsson, 3GPP TSG-RAN WG2 #69, San Francisco, USA, Feb. 22-26, 2010, 3 pages.

3rd Generation Partnership Project (3GPP), R2-101519, "MDT considerations", Email discussion rapporteur (Qualcomm Incorporated), 3GPP TSG-RAN WG2 meeting #68bis, San Francisco, United States, Feb. 22-26, 2010, 9 pages.

3rd Generation Partnership Project (3GPP), R2-102056, "Idle Mode Logged MDT reporting mechanism", Alcatel-Lucent, 3GPP TSG-RAN WG2 Meeting #69bis, Beijing, China, Apr. 12-16, 2010, 4 pages.

3rd Generation Partnership Project (3GPP), R2-102230, "Logged MDT measurement reporting", NEC, 3GPP TSG RAN2 Meeting #69bis, Beijing, China, Apr. 12-16, 2010, 3 pages.

3rd Generation Partnership Project (3GPP), R2-102358, "Introduction of idle mode measurements", Samsung, 3GPP TSG-RAN2#69 bis meeting, Beijing, P.R. China, Apr. 12-16, 2010, 3 pages.

3$^{rd}$ Generation Partnership Project (3GPP), R2-102037, "Use Broadcast Signalling to Disable MDT Function", CATT, 3GPP TSG RAN WG2 Meeting#69bis, Beijing, China, Apr. 12-16, 2010, 2 pages.

3$^{rd}$ Generation Partnership Project (3GPP), R2-101980, "Association of available location information to MDT measurements", Deutsche Telekom, 3GPP TSG RAN WG2 Meeting#69bis, Beijing, China, Apr. 12-16, 2010, 4 pages.

3$^{rd}$ Generation Partnership Project (3GPP), R2-102015, "Location information for Immediate MDT", Huawei, 3GPP TSG RAN WG2 Meeting#69bis, Beijing, China, Apr. 12-16, 2010, 3 pages.

3$^{rd}$ Generation Partnership Project (3GPP), Tdoc R2-101995, "Triggers for logged MDT measurement reporting", Ericsson, 3GPP TSG RAN WG2 Meeting#69bis, Beijing, China, Apr. 12-16, 2010, 2 pages.

3rd Generation Partnership Project (3GPP), 3GPP TS 36.305 V9.2.0, "3rd Generation Partnership Project; Technical Specification Group Radio Access Network; Evolved Universal Terrestrial Radio Access Network; (E-UTRAN); Stage 2 functional specification of User Equipment (UE) positioning in E-UTRAN (Release 9)", Mar. 2010, 52 pages.

\* cited by examiner

USING PERSONAL WIRELESS DEVICES FOR NETWORK TESTING

CROSS REFERENCE TO RELATED APPLICATIONS

This application claims the benefit of U.S. provisional application No. 61/329,215 filed Apr. 29, 2010, the contents of which is incorporated herein by reference in its entirety.

TECHNICAL FIELD

The instant application relates to systems and methods for testing networks using personal wireless devices.

BACKGROUND

Network performance testing, such as testing of wireless signal coverage in a cellular network, is typically carried out by dispatching one or more vehicles containing trained technicians that use specialized (and expensive) test equipment for carrying out certain kinds of measurements. As can be understood, this testing procedure tends to be time-consuming, expensive, cumbersome, and may sometimes lead to outdated results as a result of inadequate test procedures.

SUMMARY

Disclosed herein are systems and methods for using a personal wireless device for carrying out measurements of one or more network-performance related metrics in response to a triggering event. In one embodiment, the triggering event is a message that is transmitted by a network element to the personal wireless device. The personal wireless device may be exemplified by a variety of personal devices such as, for example, a cellular phone or a personal digital assistant (PDA). The measurements may be used to derive network-performance related information such as cellular signal coverage areas, signal hole areas, and signal interference issues.

BRIEF DESCRIPTION OF THE DRAWINGS

A more detailed understanding may be had from the following description, given by way of example in conjunction with the accompanying drawings wherein.

DETAILED DESCRIPTION

Figure 1:
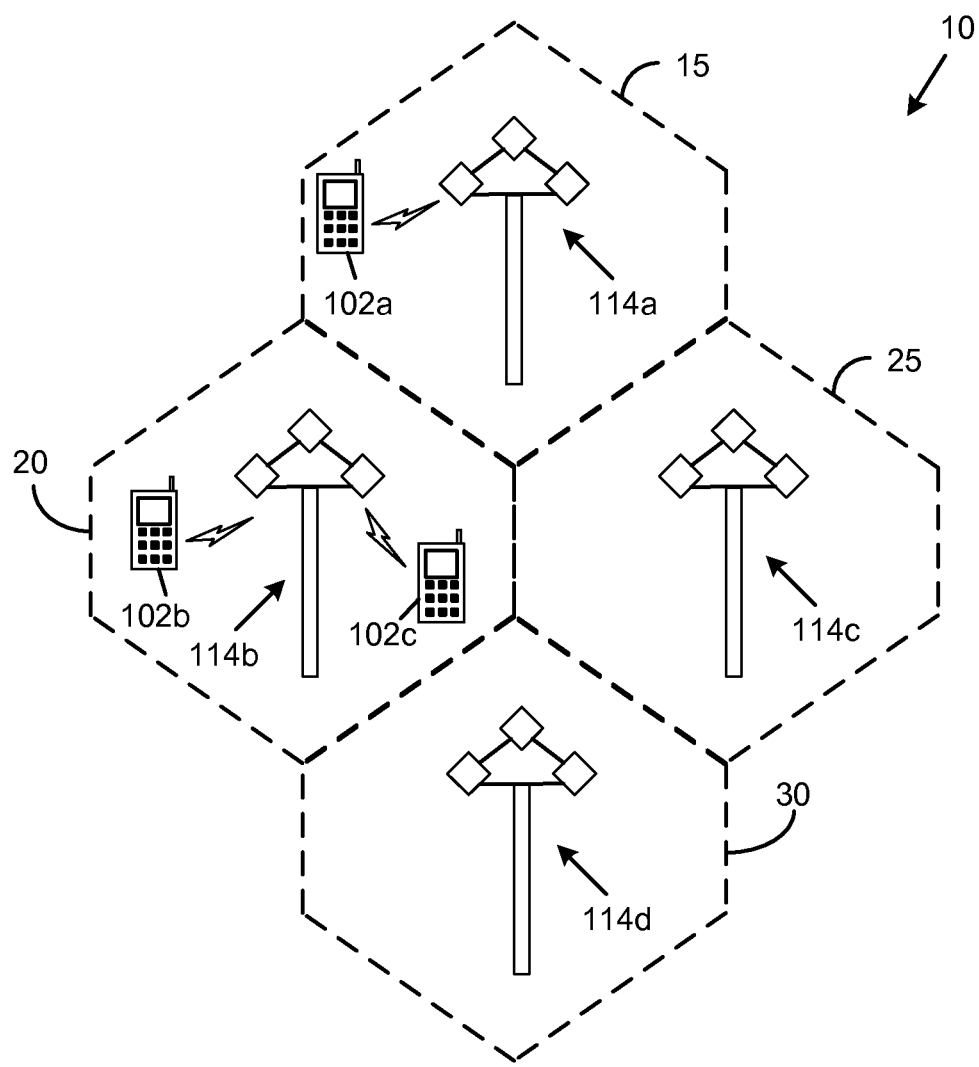
FIG. 1 shows a first embodiment of a communications system in which various personal wireless devices may be operated as testing devices in a cellular network.

It should be noted that certain words, phrases, and terms used herein have been selected on the basis of convenience for description and should not be interpreted in a limiting manner. As one such example, the phrase "personal wireless device" has been used below in several places in lieu of the more generic phrase "user equipment (UE)" which is known in the art. Consequently, it should be understood that the phrase "personal wireless device" as used herein is merely one example of a UE, and the embodiments described below may be equally applicable to various other types of devices that are generally understood to constitute UEs. Conversely, certain phrases and abbreviations known in the art have sometimes been used in place of phrases that may be more specifically applied to the various embodiments described herein. Also, although the description below provides certain examples of possible implementations, it should be noted that these are merely examples and in no way limit the scope of the application. A detailed description of illustrative embodiments will now be described.

It is generally desired by both manufacturers and by consumers to incorporate as many features and functions as possible into various popular devices. This trend is especially significant in personal devices such as cellular phones, personal digital assistants (PDAs), computing tablets, e-readers, smartphones, pagers, laptops, netbooks, personal computers and other network-enabled devices wherein numerous software applications and functions are provided in order to make these devices attractive to an end-user. However, such ubiquitous personal devices (which are generally portable in nature, often of a handheld type, and generally not tied to any one particular location), may be further exploited for executing certain functions that are beneficial not just to the end-user but to other entities (such as network operators, for example) as well. In the embodiments described herein, personal devices, specifically personal wireless devices, are configured for carrying out certain test functions that provide network-performance related information to network operators and other personnel.

As used herein, the phrase "minimization of drive test (MDT)" is generally used to refer to testing that is carried out using personal wireless devices such as, for example, those described above. As is known in the art, these personal wireless devices generally fall under the category known as user equipment (UE). The phrase "MDT" is also used herein in the context of communication protocols, system configurations, procedures etc, that are used for executing certain types of network-performance related testing. Such testing carried out using UEs may often minimize, if not completely eliminate, the need for trained technicians to drive around in a vehicle and operate specialized test equipment in order to measure network performance metrics.

The network-performance related testing described herein may be applied to a wide variety of networks such as, for example, Universal Mobile Telecommunications System (UMTS) and Long Term Evolution (LTE) networks (including Universal Terrestrial Radio Access Network (UTRAN) and Evolved UMTS Terrestrial Radio Access Network (EU-TRAN))

FIG. 1 shows a first exemplary communications system 10 that may be used to implement the various embodiments described below. Communications system 10 includes a number of base stations, four of which are shown for purposes of description. Base station 114a provide wireless coverage over a cellular coverage area 15, while base stations 104b, 104c, and 104d provide wireless coverage over cellular coverage areas 20, 25 and 30 respectively. Also shown in FIG. 1 are several UEs in the form of personal wireless devices 102a, 102b and 102c. Personal wireless device 102a communicates with base station 114a using a wireless link that includes an uplink and a downlink. Wireless information transmitted from personal wireless device 102a towards base station 114a is carried over the uplink, while information traveling in the opposite direction from base station 114a to personal wireless device 102a is carried over the downlink.

Similarly, personal wireless device 102b and personal wireless device 102c communicate with their respective base station 114b using individual uplinks and downlinks. When a personal wireless device travels from one cellular coverage area to an adjacent cellular coverage area, a handover operation takes place whereby the personal wireless device is automatically configured to establish a new wireless link with the base station that is operating in the adjacent cellular coverage area. The various personal wireless devices may operate using different wireless formats. For example, personal wireless device 102b may be assigned a single tone channel, while personal wireless device 102c may be assigned multiple tone channels. One or more of personal wireless devices 102a, 102b and 102c may be used for network testing in the manner described below in further detail.

Figure 2:
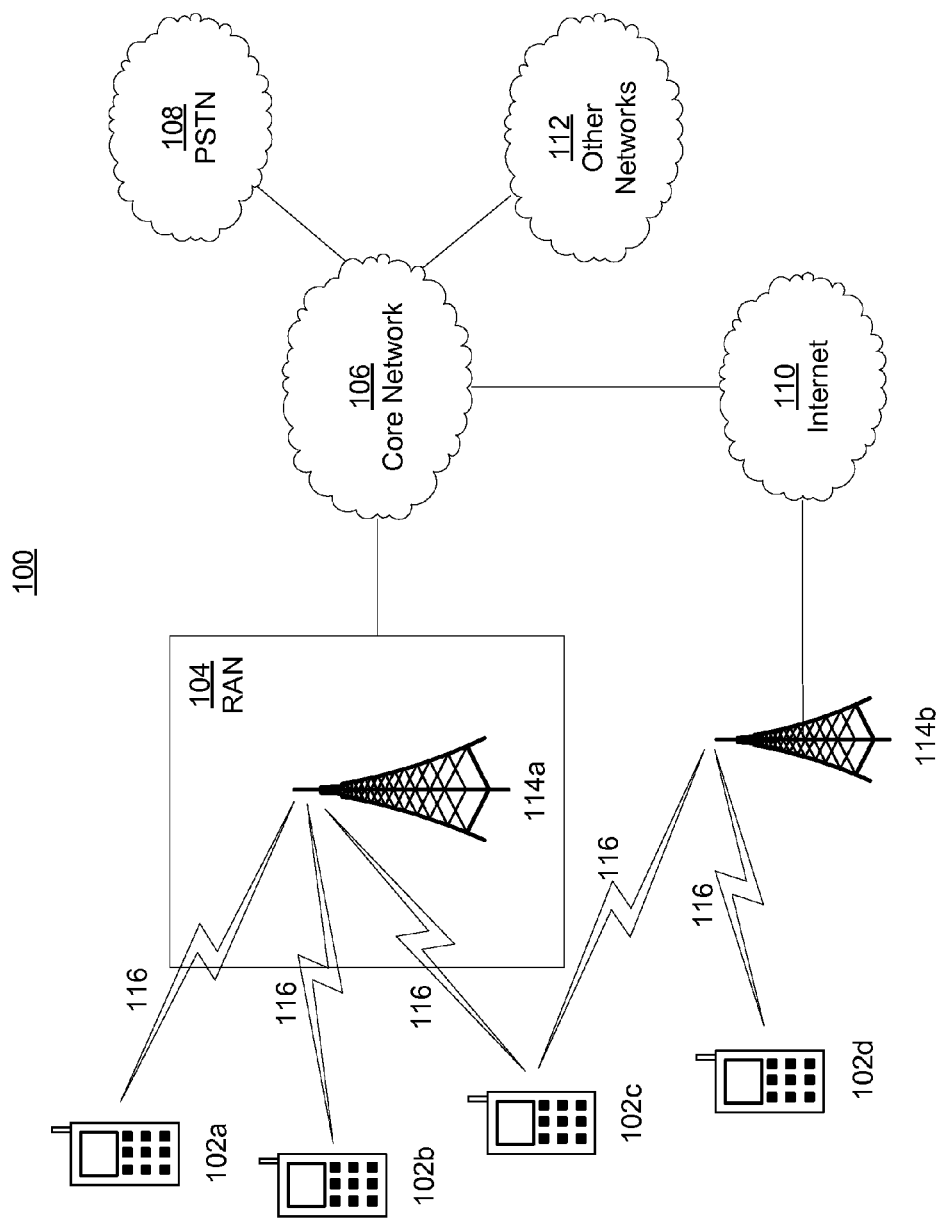
FIG. 2 shows a second system embodiment wherein various personal wireless devices are communicatively coupled to a radio access network, which in turn is communicatively coupled to a core network and other networks.

Attention is now drawn to FIG. 2, which shows a second system embodiment wherein various personal wireless devices 102a, 102b, 102c, 102d, are communicatively coupled to a radio access network (RAN) 104, which in turn is communicatively coupled to a core network 106 and other networks. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 2, the communications system 100 includes personal wireless devices 102a, 102b, 102c, 102d, a RAN 104, a core network 106, a public switched telephone network (PSTN) 108, the Internet 110, and other networks 112, though it will be appreciated that the disclosed embodiments contemplate any number of personal wireless devices, base stations, networks, and/or network elements (NEs). Each of the personal wireless devices 102a, 102b, 102c, 102d may be any type of user equipment that is configured to operate and/or communicate in a wireless environment.

The communications system 100 includes several network elements. As shown, two of these network elements, which are components of the RAN 104, are a first base station 114a and a second base station 114b. Each of the base stations 114a, 114b may include any type of device that is configured to wirelessly interface with at least one of the personal wireless devices 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected network elements, including network elements that are located in one or more different RAN.

RAN 104 may include additional base stations and/or elements that may also be referred to herein as NEs such as, for example, a radio transceiver, a base station controller (BSC), a radio network controller (RNC), relay nodes, etc. The base station 114a and/or the base station 114b may be configured to transmit and/or receive wireless signals within a particular geographic region, which may be referred to as a cell (described above using FIG. 1). Each cell may be divided into what are known as cell sectors. For example, the cell associated with the base station 114a may be divided into three cell sectors. Thus, in one embodiment, the base station 114a may include three transceivers, i.e., one for each cell sector of the cell. In another embodiment, the base station 114a may employ multiple-input multiple output (MIMO) technology and, therefore, may utilize multiple transceivers for each sector of the cell.

One or more network elements that are a part of base stations 114a, 114b may communicate with one or more of the personal wireless devices 102a, 102b, 102c, 102d over an wireless interface 116, which may be any suitable wireless communication link (e.g., radio frequency (RF), microwave, infrared (IR), ultraviolet (UV), visible light, etc.). The wireless interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the personal wireless devices 102a, 102b, 102c may implement a radio technology such as Universal Mobile Telecommunications System (UMTS) Terrestrial Radio Access (UTRA), which may establish the wireless interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the personal wireless devices 102a, 102b, 102c may implement a radio technology such as Evolved UMTS Terrestrial Radio Access (E-UTRA), which may establish the wireless interface 116 using Long Term Evolution (LTE) and/or LTE-Advanced (LTE-A).

In other embodiments, the base station 114a and the personal wireless devices 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 2 may include various network elements such as, for example, a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the personal wireless devices 102c, 102d may implement a radio technology such as IEEE 802.11 to establish a wireless local area network (WLAN). In another embodiment, the base station 114b and the personal wireless devices 102c, 102d may implement a radio technology such as IEEE 802.15 to establish a wireless personal area network (WPAN). In yet another embodiment, the base station 114b and the personal wireless devices 102c, 102d may utilize a cellular-based RAT (e.g., WCDMA, CDMA2000, GSM, LTE, LTE-A, etc.) to establish a picocell or femtocell. As shown in FIG. 2, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the personal wireless devices 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 2, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the personal wireless devices 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the personal wireless devices 102a, 102b, 102c, 102d in the communications system 100 may include multi-mode capabilities, i.e., the personal wireless devices 102a, 102b, 102c, 102d may include multiple transceivers for communicating with different wireless networks over different wireless links. For example, the personal wireless device 102c shown in FIG. 2 may be configured to communicate with the base station 114a, which may employ a cellular-based radio technology, and with the base station 114b, which may employ an IEEE 802 radio technology.

Figure 3:
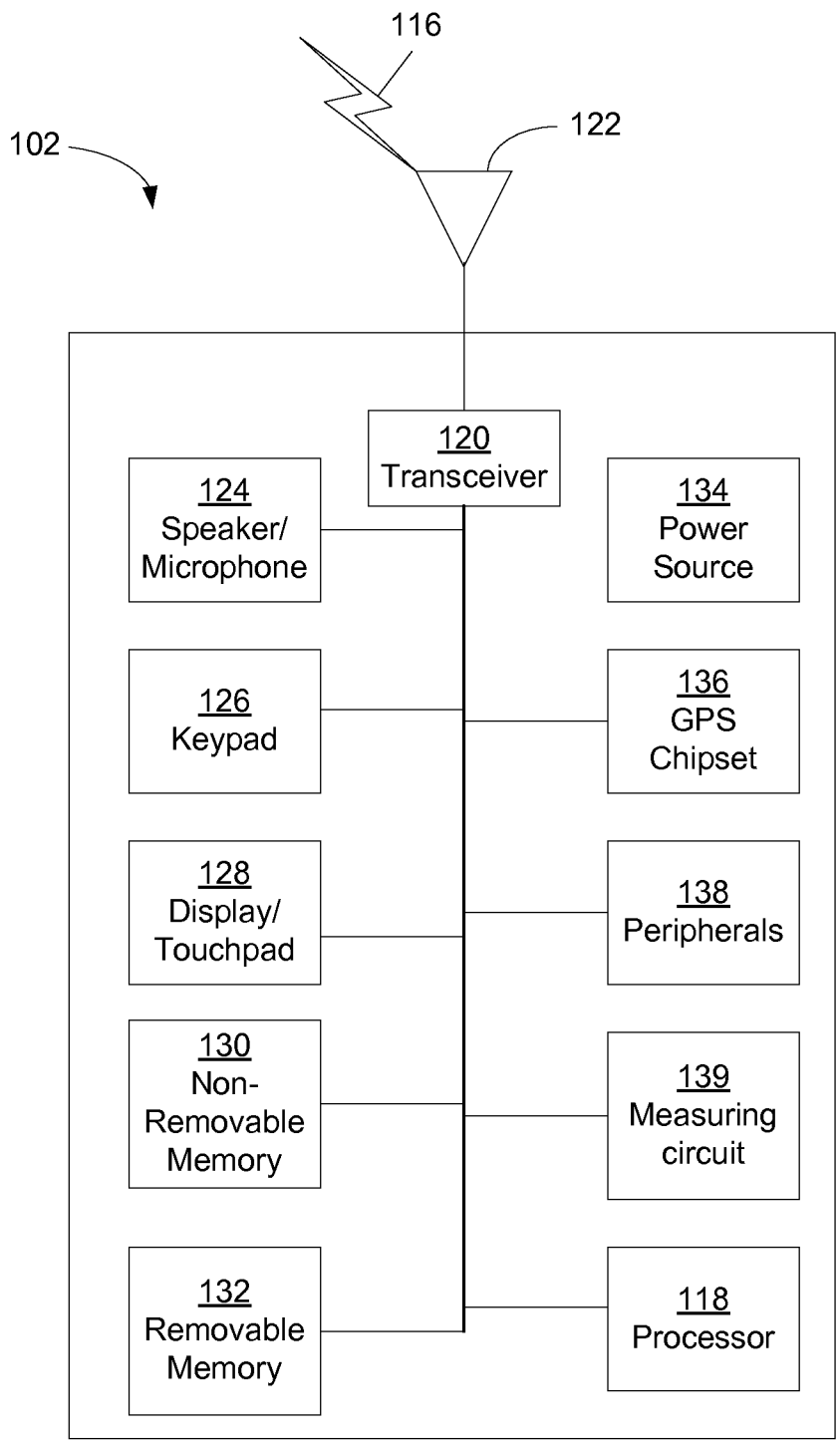
FIG. 3 shows a few components contained in an example personal wireless device.

FIG. 3 shows a few components contained in an example personal wireless device 102. As shown in FIG. 3, the personal wireless device 102 (which represents any one of the devices numerically designated in other figures as 102a, 102b, 102c etc) includes a processor 118, a transceiver 120, a signal transmit/receive element 122, a speaker/microphone 124, a keypad 126, a display/touchpad 128, non-removable memory 106, removable memory 132, a power source 134, a global positioning system (GPS) chipset 136, measuring circuit 139 and other peripherals 138 that may be communicatively coupled to each other through one or more busses. It will be appreciated that the personal wireless device 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the personal wireless device 102 to operate in a wireless environment. The processor 118 may be coupled to the transceiver 120, which may be coupled to the signal transmit/receive element 122. While FIG. 3 depicts the processor 118 and the transceiver 120 as separate components, it will be appreciated that the processor 118 and the transceiver 120 may be integrated together in an electronic package or chip.

The signal transmit/receive element 122 may be configured to transmit signals to, or receive signals from, a base station (e.g., the base station 114a) over the wireless interface 116. For example, in one embodiment, the signal transmit/receive element 122 may be an antenna configured to transmit and/or receive RF signals. In another embodiment, the signal transmit/receive element 122 may be an emitter/detector configured to transmit and/or receive IR, UV, or visible light signals, for example. In yet another embodiment, the signal transmit/receive element 122 may be configured to transmit and receive both RF and light signals. It will be appreciated that the signal transmit/receive element 122 may be configured to transmit and/or receive any combination of wireless signals.

In addition, although the signal transmit/receive element 122 is depicted in FIG. 3 as a single element, the personal wireless device 102 may include any number of signal transmit/receive elements 122. More specifically, the personal wireless device 102 may employ MIMO technology. Thus, in one embodiment, the personal wireless device 102 may include two or more transmit/receive elements 122 (e.g., multiple antennas) for transmitting and receiving wireless signals over the wireless interface 116.

The transceiver 120 may be configured to modulate the signals that are to be transmitted by the signal transmit/receive element 122 and to demodulate the signals that are received by the transmit/receive element 122. As noted above, the personal wireless device 102 may have multi-mode capabilities. Thus, the transceiver 120 may include multiple transceivers for enabling the personal wireless device 102 to communicate via multiple RATs, such as UTRA and IEEE 802.11, for example.

The processor 118 of the personal wireless device 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access executable instructions that are stored in a computer-readable storage medium. The processor 118 may execute these instructions in order to implement various functions of the personal wireless device 102. The computer-readable storage medium, which includes elements such as the non-removable memory 106 and/or the removable memory 132, may be further used to store various types of data and other digital information. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the personal wireless device 102, such as on a server or a home computer (not shown).

The processor 118 may receive power from the power source 134, and may be configured to distribute and/or control the power to the other components in the personal wireless device 102. The power source 134 may be any suitable device for powering the personal wireless device 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the personal wireless device 102. In addition to, or in lieu of, the information from the GPS chipset 136, the personal wireless device 102 may receive location information over the wireless interface 116 from a base station (e.g., base stations 114a, 114b) and/or determine its location based on the timing of the signals being received from two or more nearby base stations. It will be appreciated that the personal wireless device 102 may acquire location information by way of any suitable location-determination method while remaining consistent with an embodiment. Additional information in this context, is provided below.

The processor 118 may also be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

The measuring circuit 139 may be a hardware circuit used for carrying out various measurements such as, for example, signal strength, signal interference, noise level, and frequency parameters. As such, measuring circuit 139 may incorporate various hardware components and circuitry. Measuring circuit 139 may further cooperatively operate in conjunction with other elements such as processor 118 and memory, in order to execute various firmware and software programs.

The processor 118 may be configured to measure a network-performance related metric in response to a triggering event. In one embodiment, the triggering event may be implemented in the form of a message received via the wireless interface 116 and signal transmit/receive element 122, from an NE requesting measurement of the metric. In another embodiment, the triggering event may be a determination that the personal wireless device 102 is in a location identified as a location in which a measurement of one or more network-performance related metrics is desired. The processor 118 may be configured to transmit the result of the measurement (alternatively referred to herein as an MDT results) to the requesting NE, or a different NE, in accordance with one or more rules. For example, the one or more rules may identify which particular public land mobile network, or which particular NE, is to receive the result of the measurement.

In one embodiment, the personal wireless device carries out the measurement when the personal wireless device is in a Connected mode of operation so as to provide fast results. In this embodiment, one or more NEs may request one or more personal wireless devices to perform measurements, and the one or more personal wireless devices respond to the request in a substantially immediate and/or substantially simultaneous manner.

In another embodiment, the personal wireless device conducts the measurement as a logged-type measurement that is performed when the personal wireless device is in an Idle mode of operation. In this mode of measurement, the personal wireless device may receive configuration information pertaining to the requested operation when the personal wireless device is in a Connected mode of operation, so as to carry out the measurement in a desired manner when the personal wireless device is in the Idle mode. A radio resource control layer (RRC) procedure may be used to configure the personal wireless device for the Idle mode measurements. For example, an RRCConnectionRelease message and/or an RRCConnectionReconfiguration message may be used for this purpose. The idle mode of operation generally refers to a condition where the personal wireless device is either not being used by a person for making a telephone call or for non-telephone related personal activities such as, for example, texting, emailing, accessing the web; and/or where the personal wireless device is not actively communicating with a NE in a non-MDT-related activity (for example, handshaking with a NE of a cell, transmitting/receiving Operations, Administration & Maintenance (OAM) signals etc.)

For the logged-type measurement, the personal wireless device may be configured in one cell when in the connected mode of operation, and the measurement can then be carried out during one or more subsequent Idle modes of operation. Multiple idle periods may be interrupted via IDLE→CONN→IDLE state transitions. The results of the measurement may be reported either in the cell where the request was made, or it may be reported in another cell if the personal wireless device has moved from one cell to the other.

The configuration information for performing the logged-type measurement may include a geographical area scope parameter such as, for example, the identities of one or more cells, a local access area, a transport area, and/or a default PLMN where the measurement is to be performed. The personal wireless device may report logged MDT results to cells belonging to the same PLMN where the MDT was initially configured or to other cells.

The configuration information for performing the logged-type measurement may also specify activation/deactivation parameters indicating when to start or stop the measurements and/or the logging of the measurements. The parameters may include triggering parameters to activate the measurement such as positioning capabilities, access-classes and/or measurement probability factors. For example, one probability factor may be used by the personal wireless device as an activation measuring process in which the personal wireless device selects a random number to compare against a reference value and start the measurement based on the result of the comparison. Configuration information may also include signal thresholds, such as, for example, S-parameters. The threshold may be used as a reference criterion for starting a measurement. Configuration information may further include public information carried over broadcast signals. This information may be used to deactivate measurement operations over multiple personal wireless devices.

When the personal wireless device is in Idle mode, the logged measurement data may be kept in the personal wireless device until the personal wireless device transitions to the Connected mode again (for example, as a result of user activity such as engaging in an incoming or an outgoing call). In the RRC establishment, the personal wireless device may mark an indication in the RRCConnectionSetupComplete message to indicate to an evolved Node B (eNB) that the logged MDT data is available for reporting. The eNB may in general choose an appropriate time to notify the personal wireless device that the logged MDT data may be transmitted to the eNB. Upon receiving such permission, the personal wireless device may then transmit the MDT report(s) to the eNB.

Given that some nodes, such as legacy R8/R9 eNBs, may not support MDT reporting or usage, the personal wireless device may not always be able to report the logged MDT. In this situation, the UE may transmit an indication that MDT results may be obtained by alternative means, such as, for example, by accessing other system elements or by using certain default rules.

MDT measurements may address various network-performance related metrics such as, for example, a downlink pilot measurement (RSRP, RSRQ), a test to verify if a serving cell signal has dropped below (or exceeded) a threshold, a test to verify if a transmit power headroom has fallen below a threshold (measured periodically, or changed more steeply than the dl-pathlossChange), random access failure, paging channel failure, broadcast channel failure, radio link failure report (report with location and speed, with a cause code failure, a RACH failure or an RLC failure).

The eNB may select a specific personal wireless device to perform the MDT based on, for example, the currently connected personal wireless devices, personal wireless devices with a particular subscription SPID, IDs of personal wireless devices, current location of one or more personal wireless device, capability of a personal wireless device.

MDT specific control mechanisms, including MDT functionality, may incorporate, for example, validation and acceptance of a logged MDT measurement configuration, validation and acceptance of logged MDT reports, details of MDT report interactions and procedures, network location aspects (for example, cell location, device location etc) where one or more personal wireless device may report MDT logged data while not causing undesirable network traffic (for example, excessive/unnecessary network traffic), and the geographical location detection for the activation of the measurement with respect to the Logged-type MDT measurements in Idle mode.

In some portions of the following description the term "UE" has been used in place of personal wireless device. This has been done for purposes of convenience, as mentioned above, and encompasses various types of devices including the personal wireless device referred to in various parts of this application.

When MDT supporting UEs are in operation, un-scrutinized MDT commands and configuration requests may result in UEs performing measurements in the wrong place or on the wrong network. UEs may be able to store the MDT requests and configuration information based on options for supporting the requests. UEs may be able to discard the MDT requests if deemed inappropriate. For example, rules and mechanisms governing when and where UEs accept MDT requests and provide MDT reports may be specified. Also, other aspects of the MDT configuration to support special cases such as network sharing and emergency calls may be specified as well.

MDT-enabled UEs may roam from network to network, moving through multiple PLMNs. An MDT-enabled UE may enter a PLMN where the UE is not authorized to, or should not, perform MDT. The eNB to which this UE is connected may not be aware if the UE is permitted to perform MDT. However, the eNB may still opt to request this UE to carry out an MDT based on certain considerations.

A MDT-enabled UE may include a module (for example, an Operations, Administration & Maintenance (OAM) module, or by pre-programming in a SIM) that provides information as to, for example, authorized PLMNs, cells in which the UE is permitted to accept requests to perform MDT measurements, and PLMNs to which MDT measurement results may be reported).

A MDT-enabled UE may be able to honor MDT requests from more than one PLMN if the UE is explicitly or implicitly permitted to do so. For example, the UE may have a pre-programmed list of PLMNs or cells for which it is permitted to perform MDT measurements. If there is more than one PLMN in the list, the UE may accept requests from a cell belonging to any of those PLMNs to perform MDT measurements. Although the UE may accept requests from multiple PLMNs, the MDT measurement functionality of the UE may be defined to perform measurements for a specified PLMN or for specified multiple PLMNs.

A MDT-enabled UE may demur MDT requests that cannot be supported by the UE. In one embodiment, the UE may explicitly reject the request, and/or may provide a "not allowed" indication for example, or provide other such indication as a reason for the rejection. In another embodiment, the UE may opt to ignore the request to perform the requested MDT measurements. In yet another embodiment, the MDT-enabled UE may turn one or more MDT-support-capability indication(s) off in its capabilities information when the MDT-enabled UEs roams into PLMNs or cells that it is not permitted to receive MDT configuration, or not permitted to perform MDT measurements. The personal wireless device may indicate it does not support the MDT requests when indicating its capabilities in the areas or networks that it is not authorized to support MDT.

To explain this aspect in more detail, a UE may travel around the world and may camp or connect to cells belonging to different mobile networks, for example, to various PLMNs. This UE may not always find, and/or register with, a home PLMN (HPLMN). Given that the UE supporting MDT (such as LTE MDT) may be commissioned or authorized to perform the MDT measurement per one specific network operator and that the MDT and MDT configurations may be defined differently by other network operators, it can be understood that it is desirable to configure the UE so as to enable the UE to reject MDT requests from unauthorized network nodes.

A UE that supports MDT may reject MDT requests/configurations (either one or both of the Immediate-type MDT in Connected and the Logged-type MDT in Idle mode) when the MDT requests or configurations come from unauthorized cells. Unauthorized cells may include, for example, a cell that does not belong to the home PLMN (HPLMN) of the UE, a cell that does not belong to the equivalent HPLMN (EH-PLMN) of the UE, a cell that belongs to the UE's "forbidden PLMN" List, a cell on which the UE has camped in "limited service" mode or has attached using the emergency attach procedure, a cell that belongs to a PLMN that is not included in a predefined list of MDT authorized PLMNs (such as one stored in the UE's USIM or other higher layer memory) that are authorized to request MDT, a cell that is not included in a predefined list of authorized MDT cells (such as one stored in the UE's USIM or other higher layer memory) that are authorized to request MDT, any cell designated in any manner as unauthorized for MDT, and/or the like.

When the MDT requestor is an unauthorized MDT requestor, a UE may have the option to support the MDT commands/configurations provided by the MDT requestor, or may opt to refuse the request as described above.

A UE may opt to accept MDT requests (commands and configurations) from one or more MDT requestors on the basis of a list of authorized MDT requestors that may be stored for example, in a USIM of the UE or in a higher layer storage. Conversely, the UE may also opt to accept a MDT request from a requestor who is not included in a list of unauthorized MDT requestors.

A UE may opt to return a cause code such as "not commissioned," or "unauthorized," upon receiving a MDT request from an unauthorized requestor, indicating that the UE is not able to handle, or is not authorized to handle, the measurement request.

In the case of network sharing (e.g. the eNB or the cell may be shared by more than one PLMN and more than one PLMN ID may be included in the IE PLMN-IdentityList of the SystemInformationBlockType1), the UE NAS may select one particular PLMN and set this particular PLMN in the IE selectedPLMN-Identity of the RRCConnectionComplete message at the completion of the RRC connection. In this case, the UE may be deemed as being associated with this particular PLMN. As mentioned above, the UE may opt to reject MDT requests from an unauthorized requestor amongst the various PLMNs.

However, a UE may connect to a cell not belonging to its HPLMN or EHPLMN for purposes of servicing an emergency call. If an MDT request is received from the temporarily registered PLMN during, or upon termination, of the emergency call, the UE may still refuse to service the request if the temporarily registered PLMN is an unauthorized requestor.

A UE having a logged-type MDT measurement results ready for transmission may be provided a "reporting place" list so that the UE provides MDT measurement results in suitable places, thereby minimizing unnecessary network forwarding traffic and unnecessary UE/eNB interactions. The reporting place list may include various items such as, for example, one or more cell-identities, one or more LA/RA/TA area identities, or one or more PLMN identities. The UE uses the list to verify cell ID/area/PLMN etc of the cell to which the UE is currently connected in order to determine whether a report availability message or an indication may be issued to the connected network element.

A UE having a logged-type MDT measurement result may opt to place the result on hold if the UE is currently connected to an unauthorized cell or a cell belonging to an unauthorized PLMN, and transmit the result once the UE connects to an authorized cell or PLMN. In one embodiment, the UE does not indicate to the unauthorized cell that the logged-type MDT measurement result is available for transmission. This may be implemented by precluding this information when providing a MDT report indication.

An "authorized MDT Report Range List" may be created, for example, in the form of a PLMN list and/or a cell list. One or more cells that are included in the list may be authorized to receive MDT results, where the results may be provided in the form of a MDT report. For example, one or more MDT supporting UE with logged-type MDT measurement result available to report, may transmit the result to one of the authorized receiver cells, as a result, for example, of being unable to transmit the result to a first cell that had originated the MDT request.

A UE MDT measurement area list may be established in a higher layer memory associated with a UE, as a default list. The MDT measurement area list may include PLMNs and/or cells where, in the absence of specific areas being designated for measurement in the MDT request configuration, the UE may perform the requested measurements when the UE is located in any one or more other areas defined in the list (assuming that the list is a populated list).

In another embodiment, the UE may perform the configured measurement in either the cell where the UE has received the request or in one or more cells belonging to a registered PLMN. For example, in the absence of other directives, such as, for example, pre-configured and/or pre-listed directives, the UE may perform the configured measurement in either the cell where the UE has received the request or in one or more other cells belonging to the registered PLMN.

A UE may be unable to support an Immediate MDT request and configuration if the UE is currently engaged in an emergency call, even if the MDT requestor is an authorized requestor. In this case, the UE may return a cause code such as "emergency", indicating that the UE is unable to handle the "Immediate MDT measurement Request." In one embodiment, the UE may service the MDT request after completion of the emergency call.

A UE may delay responding to an Immediate MDT request and configuration when the UE has already has been assigned RRM measurements with certain measurement gaps, and/or is servicing telephone calls. The MDT configuration context may be saved until such time that the UE is able to respond to the MDT request.

A UE may also assume a "best-effort" reporting where higher priority measurements are being undertaken, and/or where the reporting is to be accommodated within certain limited connected mode measurement time frames. For example, if a UE is requested to carry out, for example, a reference signal received power (RSRP) measurement or a reference signal received quality (RSRQ) measurement, and a set of neighbor cell measurements in intra-freq and inter-freq bands, but is not able to fully do so due to lack of resources to measure inter-freq, the UE may report measurement results pertaining to the server cell, but not report neighbor cell related measurements.

Given the varying nature of a network and the geographical environment, certain MDT measurements may change at various locations of the network. Consequently, a previously configured MDT measurement may lose its significance and, therefore, execution of such an outdated measurement may waste device power and network resources. In order to minimize such obsolete or redundant MDT measurements and reporting, the MDT measurement for Idle mode configuration may specify a measurement-validity-time, a report-validity-time, and/or the like.

The measurement-validity-time may be used to provide an indication to the UE as to when making MDT measurements may no longer be necessary. For example, if the measurement-validity-time is over, the UE may suspend measurements irrespective of having started on measurements or not started. Similarly, if the report-validity-time is over, the UE may suspend a report attempt and may delete the obsolete logged information if such information existed. The UE may also remove and/or delete an originated measurement request.

In some implementations, a MDT configuration may be used to specify one or more places where MDT results reporting can be carried out. This is done in order to reduce unnecessary network traffic and conserve network resources. For example, some logged MDT results can be reported in the cells belonging to the HPLMN or belonging to the EHPLMN. Some logged MDT reports may be reported in one or more specified tracking areas, or in one or more cells in a cell-list. In certain implementations, a MDT measurement may be reported in the cell or PLMN that configured the measurements. A UE having logged data may trigger the reporting (e.g., indicate that a report is available) when the UE connects to a cell in one of the specified reporting places. This "reporting place" can be specified at cell ID level, TA/RA/LA/URA, or PLMN or selected PLMN range level to ensure that the UE to the appropriate network for the MDT results to be properly processed.

In a 3-step MDT logged measurement report scenario, the UE may indicate with a marked MDT reporting indicator (for example, in an RRCConnectionSetupComplete message) as to what parameters will be reported. This indication may include various items such as, for example, a MDT configuration order ID, an indication of the age of the log (for example the timestamp of the last measurement), the area-scope for the data obtained (such as an ID or other value that represents the area-scope, or a list including IDs for the cells, PLMNs, TA/RA/LA/URA that are part of the area-scope. Furthermore, if the area-scope is UE positioning information, the data may include the format of the positioning info, and a logged data category or categories, if such categories are provided as part of the MDT measurement request and/or configuration. The logged data category may indicate what type of measurements are included in the log such as, for example, serving cell measurements, neighbor cell measurements, error conditions, etc.

A cell may reject the MDT UE marked MDT reporting indication (such as, for example, an indication in the RRC-ConnectionSetupComplete message). The MDT reporting indication may be rejected because the cell is not the right place (for example, measurements are of no interest to the cell or the cell may have no transfer method to the network entity that is targeted to obtain the measurements) to receive this category or order-ID of the logged MDT measurement data report and/or the report that was indicated by the UE is obsolete (for example due to the age of the log or the area-scope).

The rejection may be carried out in several ways. For example, the cell may ignore the indication from the UE and not respond at all, or the cell may send a rejection indication to the UE. The rejection indication may or may not indicate a cause for the rejection. In this case, the UE may opt to retain the measurement report until the UE enters the correct cell area.

A cell may send a rejection to the UE, with an indication that the measurement data in an MDT report is obsolete or invalid. The cell may also send a log purge message or a termination and purge message. The UE may delete the logged data intended for reporting, and/or the UE may also delete the existing MDT request associated with an Idle measurement configuration.

A cell may publish a MDT report reception parameters and/or an indication that the cell is a MDT cell. For example, the cell may indicate this information in the form of a system information block, in multicast messages to the UEs supporting MDT (through a MDT-RNTI and the related method), and/or a dedicated message signal to one or more UEs with a MDT parameter ID. The information may include for example, a list of one or more categories that the cell is willing to receive in an MDT report, what MDT configure order ID range the cell is willing to receive, which one or more originating configuring cells (cells that configured the MDT measurements) it is willing to recognize, a report validity time. This approach may minimize wastage in time and/or resources in indication and response exchange communications.

UEs with logged MDT measurement data ready to report may learn from the MDT system information, from the multicast indication message (MDT-RNTI), and/or from the dedicated signaling MDT IE when the UE is connecting with the cell whether the cell is an appropriate recipient for receiving MDT measurement data, and whether the logged MDT measurement data can be reported in the cell area. If the system information fails to indicate that the logged MDT report data is suitable to report in this cell, the UE may decide not to send the report-indicator to the cell. For example, the UE device may determine to not set the report-indicator in its RRCConnectionComplete message. This process addresses certain issues that may arise when to or more competing carriers are providing service in the same cell area.

Report validity indicates to the UE the lifespan of the logged report from the time the last measurement is taken to the time it is reported to the network. A UE may discard the MDT report as no longer valid if the report validity time has elapsed.

A UE may include a mechanism to obtain location information. This information may be helpful, for example, when the UE is configured to carry out logged-type measurements during Idle mode of operation. The location information may be obtained in several different ways. In a first implementation, the UE may be equipped with a built-in GPS. In a second implementation, the UE may include a triggered position detection system that may be used to inform the UE when the UE is located at a location of interest. Triggers may include parameters such as, for example, an error event (e.g. Out of Service), detection of a signal threshold, or time-related events. In a third implementation, the UE may include a position detection that may be queried intermittently or periodically for location information. In an alternative embodiment, the UE may transmit a query to one or more network elements to obtain location information. The query may take on the form of a mobile originated location request (such as a MO-LR per 36.305, for example) to the network to obtain its position.

If the MDT measurement activation is to be triggered by a geographical area of interest, a two-step process may be used. The UE may first use a coarse location method (for example read the cell identities or other geographical identities such as the LA/RA/TA identities in order to minimize power consumption and network traffic) to obtain general location information to recognize if the UE is close to the geographical area of interest. The UE may then switch to a different location identification scheme to acquire more accurate position information, once the UE is in proximity to the geographic area of interest. The two-step process may be useful when the UE is not equipped with a GPS device, or does not want to waste battery power on unnecessary positioning activity such as measurements and signaling.

The original MDT requestor and/or an authorized MDT requestor described above may reconfigure a UE in order to modify an existing MDT request or to provide a new MDT request. An old MDT request and/or logged measurements may be deleted. In some cases, this deletion may be carried out regardless of the request being satisfied and/or the measurements being provided. In some implementations, a UE may discard an old MDT configuration and replace the old MDT configuration with a new MDT configuration upon receiving a valid request from an authorized cell for carrying out a logged-type MDT in Idle measurement. The UE may begin using the new MDT configuration the next time the UE enters an idle mode of operation. In some cases, the new MDT configuration may be used if the PLMN of the requesting cell is not the same as a previous requestor whose measurements are currently available in the log. The UE may purge this existing log for example, if the requesting cell is not authorized to receive the information from this log. In some other cases, the UE may reject the new request with a cause of "log not empty." If the previous log of measurements is not empty and the PLMN of the requesting cell is the same as the one that asked for measurements currently in the log (e.g., the cell did not ask for the report), the UE may purge the log and begin using the new configuration once in idle mode. Here again, the UE may reject the new request from the same requesting cell, by responding with a cause indicating "log not empty." As an alternative, the UE may retain the existing log and start a new log.

In some implementations, a MDT measurement request may include an indication as to whether to purge an existing log if there is one, or not. A UE may purge, or retain, the existing MDT measurement log on the basis of this indication.

The original MDT requestor and, optionally, any authorized MDT requestor for a given UE, may cancel a MDT request to the UE. If the UE has not yet begun measurements, the UE receiving the MDT-Cancel command may remove the original request and/or may determine not to make the requested measurements even when activation conditions match. If the request has been executed, the UE may discard the logged MDT report, discard the configuration, and not perform anymore MDT measurements.

Where the UE is able to hold more than one MDT request, the above described reconfiguration activity may be addressed with the original MDT-Request-ID. Also, the requestor may be either the original requestor or one of the "authorized MDT request" described above.

In the case of network sharing (e.g. the eNB or the cell is shared by more than one PLMN and more than one PLMN ID is included in the IE plmn-IdentityList of the SystemInformationBlockType1), the UE NAS may select one PLMN and set it to the IE selectedPLMN-Identity of the RRCConnectionComplete message at the completion of the RRC connection. In this case, the UE may be considered to be associated with the network identified by the selectedPLMN-Identity.

With regard to a UE configured for logged-type MDT where the PLMN that originated the MDT request is PLMNx, if such a UE connects to a eNB or cell that is shared by more than one PLMN and one of the PLMNs in the plmn-IdentityList is PLMNx, the UE NAS may select PLMNx and set it to the IE selectedPLMN-Identity of the RRCConnectionComplete message at the completion of the RRC connection. In this case, the UE connection may be considered to be registered with the network identified by the selectedPLMN-Identity, which is PLMNx (RPLMN) and/or the personal wireless device may accept MDT requests and generate MDT reports for PLMNx accordingly.

Contents such as, for example, list members, of the MDT-operations related authorization lists described above may be pre-programmed from service agreement and they can also be re-assigned by network signaling. The NAS signaling, such as the "ATTACH ACCEPT," the "Tracking Area Update ACCEPT," and/or the "Detach Accept" messages, for example, may be used. In an embodiment, the RRC messages such as the RRCConnectionSetup, the RRCConnectionReconfiguration, and/or the RRCConnectionReestablishment messages may be used for this purpose.

Authorized or unauthorized list members may be added or removed from an existing MDT operating authorization list, initially from the USIM, according to the following time scope: being valid for the RRC Connection, being valid for the tracking area, and/or being valid for the Attached network (e.g. from ATTACH ACCEPT to DETACH ACCEPT).

Figure 4:
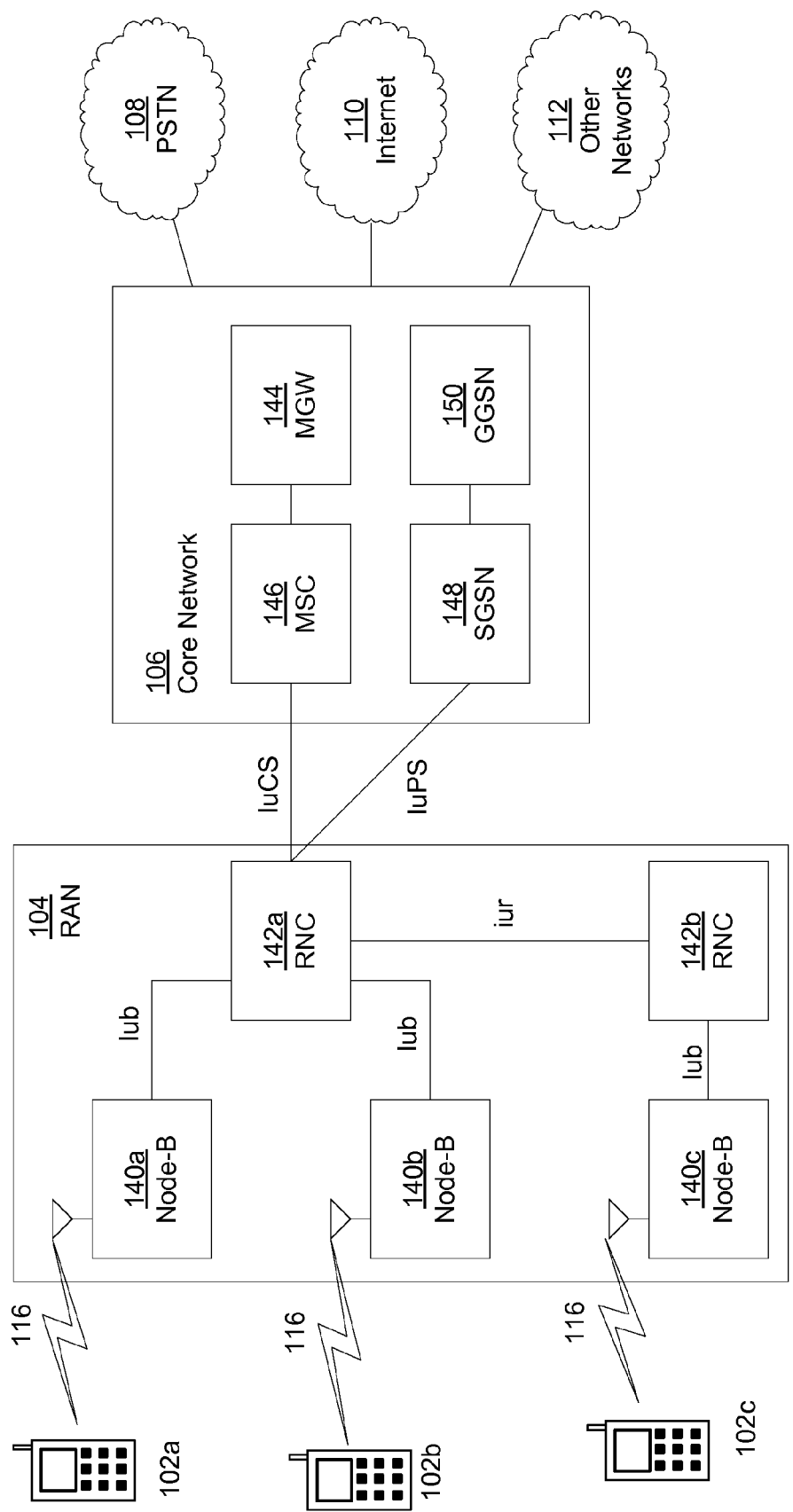
FIG. 4 shows a third system embodiment wherein various personal wireless devices are communicatively coupled to a radio access network, which in turn is communicatively coupled to a core network and other networks.

Attention is now drawn to FIG. 4, which shows a third system embodiment wherein various personal wireless devices 102a, 102b and 102c are communicatively coupled to a RAN 104, which in turn is communicatively coupled to a core network 106 and other networks. The RAN 104 may employ UTRAN radio technology to communicate with the personal wireless devices 102a, 102b, 102c over the wireless interface 116. The RAN 104 may also be in communication with the core network 106 through one or more communication links. As shown in FIG. 4, the RAN 104 may include Node-Bs 140a, 140b, 140c, which may each include one or more transceivers for communicating with the personal wireless devices 102a, 102b, 102c over the wireless interface 116. The Node-Bs 140a, 140b, 140c may each be associated with a particular cell (as described above using FIG. 1) within the RAN 104. The RAN 104 may also include radio network controllers (RNCs) 142a, 142b. It will be appreciated that the RAN 104 may include any number of Node-Bs and RNCs and is not limited to the numbers shown in FIG. 4.

Furthermore, as shown in FIG. 4, the Node-Bs 140a and 140b may be in communication with the RNC 142a, while the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out, or support, other functionality, such as outer loop power control, load control, admission control, packet scheduling, handover control, macrodiversity, security functions, data encryption, and the like.

The core network 106 shown in FIG. 4 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the personal wireless devices 102a, 102b, 102c with access to circuit-switched networks, such as the PSTN 108, to facilitate communications between the personal wireless devices 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the personal wireless devices 102a, 102b, 102c with access to packet-switched networks, such as the Internet 110, to facilitate communications between and the personal wireless devices 102a, 102b, 102c and IP-enabled devices.

As noted above, the core network 106 may also be connected to the networks 112, which may include other wired or wireless networks that are owned and/or operated by other service providers.

Figure 5:
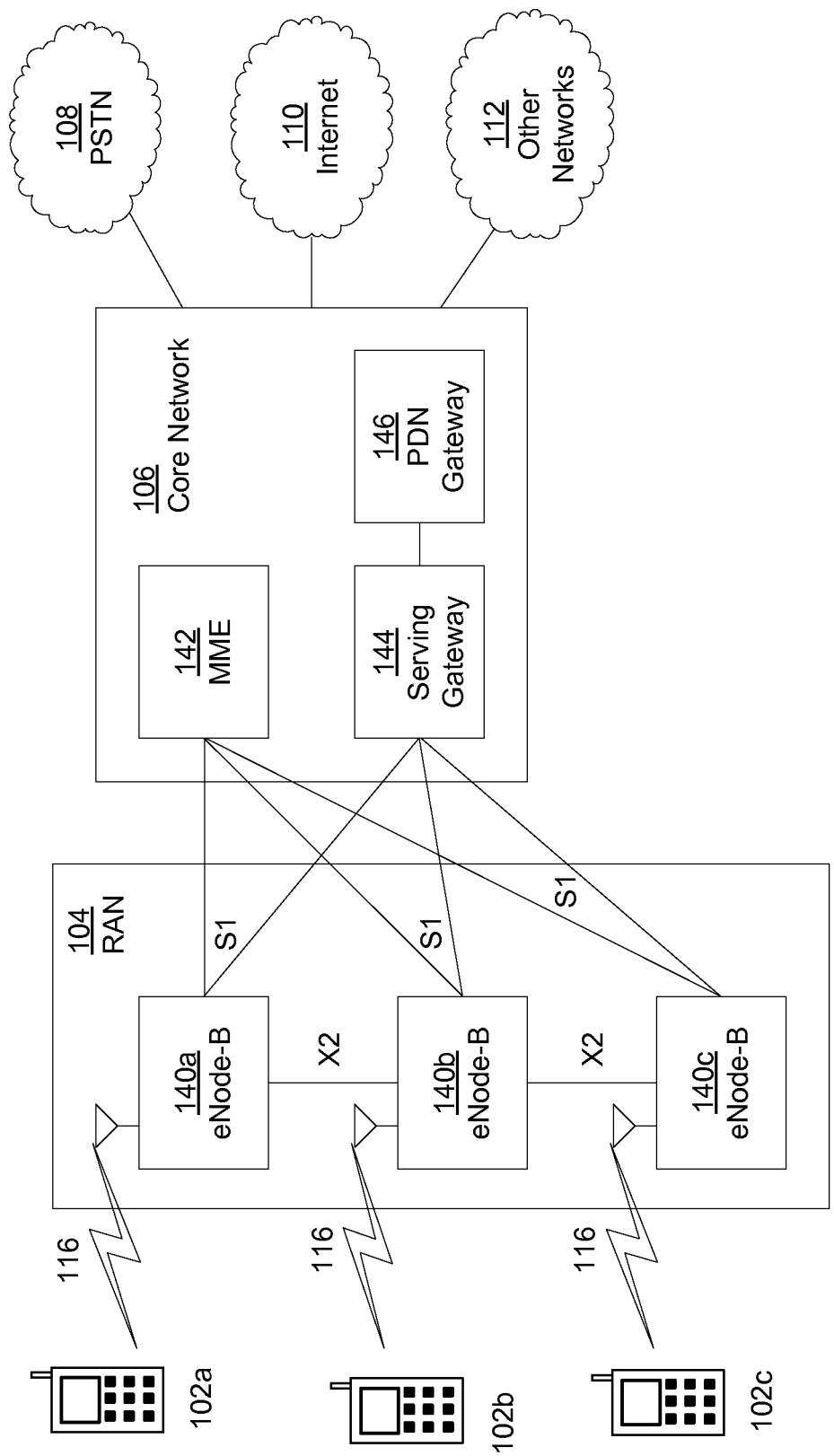
FIG. 5 shows a fourth system embodiment wherein various personal wireless devices are communicatively coupled to a radio access network, which in turn is communicatively coupled to a core network and other networks.

FIG. 5 shows a fourth system embodiment wherein various personal wireless devices 102a, 102b and 102c are communicatively coupled to a RAN 104, which in turn is communicatively coupled to a core network 106 and other networks. In this embodiment, the RAN 104 may employ an E-UTRA radio technology to communicate with the personal wireless devices 102a, 102b, 102c over the wireless interface 116. The RAN 104 may also be in communication with the core network 106 through one or more communication links.

The RAN 104 may include eNode-Bs 140a, 140b, 140c, though it will be appreciated that the RAN 104 may include any number of eNode-Bs and is not limited to the numbers shown in FIG. 45. The eNode-Bs 140a, 140b, 140c may each include one or more transceivers for communicating with the personal wireless devices 102a, 102b, 102c over the wireless interface 116. In one embodiment, the eNode-Bs 140a, 140b, 140c may implement MIMO technology. Thus, the eNode-B 140a, for example, may use multiple antennas to transmit wireless signals to, and receive wireless signals from, the personal wireless device 102a.

Each of the eNode-Bs 140a, 140b, 140c may be associated with a particular cell (as described above using FIG. 1) and may be configured to handle radio resource management decisions, handover decisions, scheduling of users in the uplink and/or downlink, and the like.

The core network 106 shown in FIG. 5 may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the personal wireless devices 102a, 102b, 102c, bearer activation/deactivation, selecting a particular serving gateway during an initial attach of the personal wireless devices 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the personal wireless devices 102a, 102b, 102c. The serving gateway 144 may also perform other functions, such as anchoring user planes during inter-eNode B handovers, triggering paging when downlink data is available for the personal wireless devices 102a, 102b, 102c, managing and storing contexts of the personal wireless devices 102a, 102b, 102c, and the like.

The serving gateway 144 may also be connected to the PDN gateway 146, which may provide the personal wireless devices 102a, 102b, 102c with access to packet-switched networks, such as the Internet 110, to facilitate communications between the personal wireless devices 102a, 102b, 102c and IP-enabled devices.

The core network 106 may facilitate communications with other networks. For example, the core network 106 may provide the personal wireless devices 102a, 102b, 102c with access to circuit-switched networks, such as the PSTN 108, to facilitate communications between the personal wireless devices 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the personal wireless devices 102a, 102b, 102c with access to the networks 112, which may include other wired or wireless networks that are owned and/or operated by other service providers.

Figure 6:
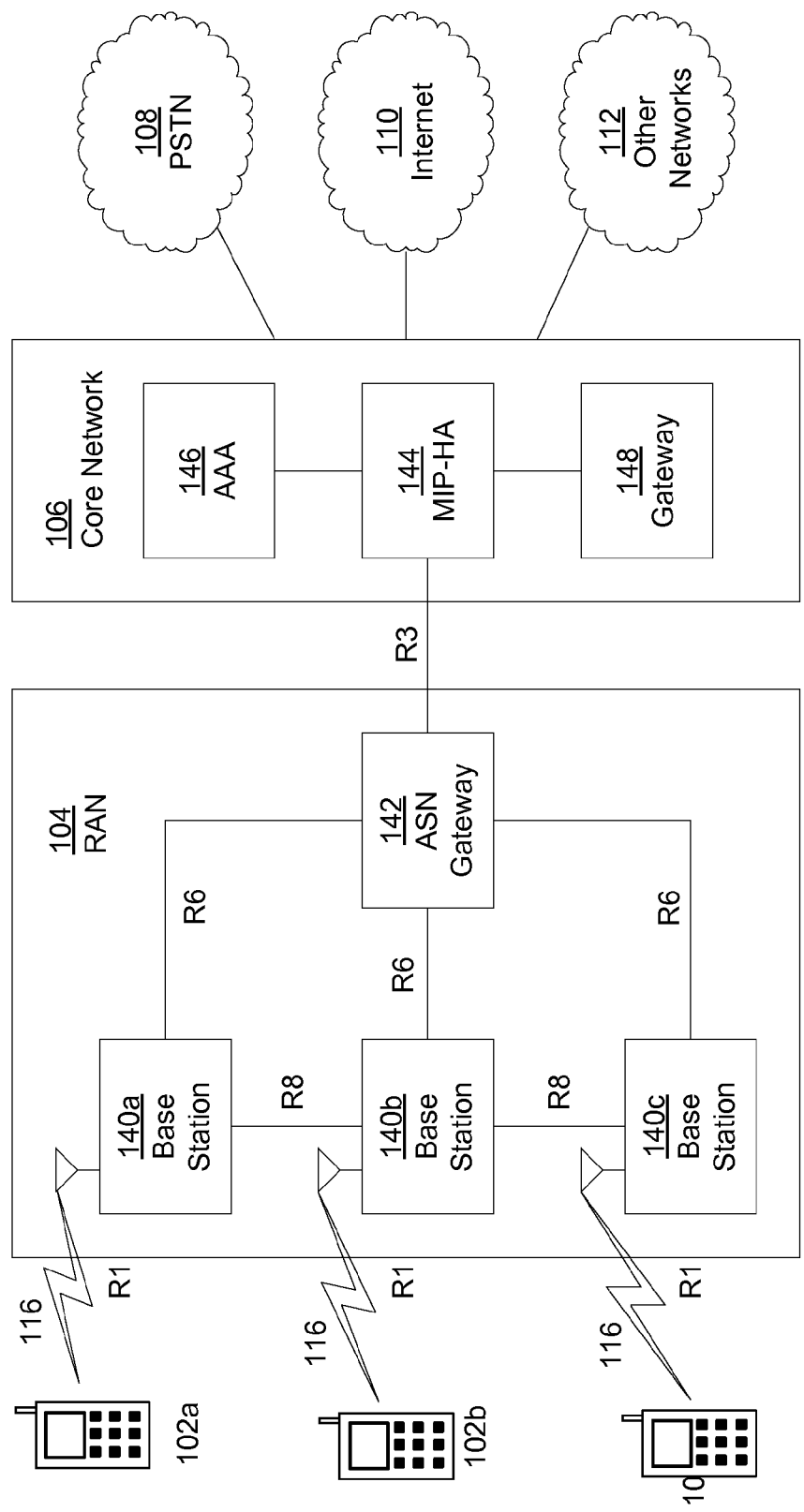
FIG. 6 shows a fifth system embodiment wherein various personal wireless devices are communicatively coupled to a radio access network, which in turn is communicatively coupled to a core network and other networks.

FIG. 6 shows a fifth system embodiment wherein various personal wireless devices 102a, 102b, and 102c are communicatively coupled to a RAN 104, which in turn is communicatively coupled to a core network 106 and other networks. In this embodiment, RAN 104 may be an access service network (ASN) that employs IEEE 802.16 radio technology to communicate with the personal wireless devices 102a, 102b, 102c over the wireless interface 116. As will be further discussed below, the communication links between the different functional entities of the personal wireless devices 102a, 102b, 102c, the RAN 104, and the core network 106 may be defined as reference points.

As shown in FIG. 6, the RAN 104 may include base stations 140a, 140b, 140c, and an ASN gateway 142, though it will be appreciated that the RAN 104 may include any number of base stations and ASN gateways. The base stations 140a, 140b, 140c may each be associated with a particular cell (not shown) in the RAN 104 and may each include one or more transceivers for communicating with the personal wireless devices 102a, 102b, 102c over the wireless interface 116. In one embodiment, the base stations 140a, 140b, 140c may implement MIMO technology. Thus, the base station 140a, for example, may use multiple antennas to transmit wireless signals to, and receive wireless signals from, the personal wireless device 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The wireless interface 116 between the personal wireless devices 102a, 102b, 102c and the RAN 104 may be defined as an R1 reference point that implements the IEEE 802.16 specification. In addition, each of the personal wireless devices 102a, 102b, 102c may establish a logical interface (not shown) with the core network 106. The logical interface between the personal wireless devices 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the personal wireless devices 102a, 102b, 100c.

As shown in FIG. 6, RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the personal wireless devices 102a, 102b, 102c to roam between different ASNs and/or different core networks. The MIP-HA 144 may provide the personal wireless devices 102a, 102b, 102c with access to packet-switched networks, such as the Internet 110, to facilitate communications between the personal wireless devices 102a, 102b, 102c and IP-enabled devices. The AAA server 146 may be responsible for user authentication and for supporting user services. The gateway 148 may facilitate interworking with other networks. For example, the gateway 148 may provide the personal wireless devices 102a, 102b, 102c with access to circuit-switched networks, such as the PSTN 108, to facilitate communications between the personal wireless devices 102a, 102b, 102c and traditional land-line communications devices. In addition, the gateway 148 may provide the personal wireless devices 102a, 102b, 102c with access to the networks 112, which may include other wired or wireless networks that are owned and/or operated by other service providers.

Although not shown in FIG. 6, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the personal wireless devices 102a, 102b, 102c between the RAN 104 and the other ASNs. The communication link between the core network 106 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed:

1. A device configured to:
   receive configuration information for carrying out a measurement;
   carry out the measurement of a network-performance related metric consistent with the configuration information, wherein the measurement is carried out when a cell or public land mobile network (PLMN) of the device is a cell or PLMN authorized for the measurement to be performed at; and
   transmit a result of the measurement or an indication of an availability of the measurement to a network element, wherein the result or indication is transmitted when a cell or PLMN the device is connected to is a cell or PLMN included in a list that includes at least one reporting place authorized for reporting the measurement.

2. The device of claim 1, wherein the measurement is further carried out in response to a first triggering event.

3. The device according to claim 1, wherein the network-performance related metric comprises at least one of a downlink pilot signal strength, a signal power headroom, or a neighboring cell signal strength.

4. The device according to claim 1, wherein the device is at least one of a cellular telephone, a personal digital assistant device, or an internet-enabled wireless device.

5. The device according to claim 1, wherein the measurement is a logged-type measurement carried out when the device is in an idle mode of operation.

6. The device according to claim 5, wherein the device is configured to further carry out the logged-type measurement when the device is in a first cell coverage area and to further transmit the result of the logged-type measurement to the network element when the device is in a second cell coverage area.

7. The device according to claim 6, wherein the device is configured to transmit a location identification request message to the network element for obtaining geographic position information of the device.

8. The device according to claim 7, wherein the device is configured to activate the logged-type measurement after ensuring that the geographic position is under network coverage jurisdiction of a first network operator authorized to transmit the configuration information to the device or authorized for the measurement.

9. The device according to claim 2, wherein the device is further configured to accept the configuration information or first triggering event from a first network operator and explicitly reject additional configuration information or a second triggering event originated by a second network operator.

10. The device according to claim 9, wherein the device comprises a memory in which is stored an identity of the first network operator.

11. The device according to claim 2, wherein the device is further configured to negatively respond to the configuration information or first triggering event if the configuration information or first triggering event occurs when the device is engaged in servicing an emergency call.

12. The device according to claim 1, wherein the configuration information comprises a measurement validity time and a report validity time.

13. The device according to claim 12, wherein the device is further configured to stop carrying out the measurement of the network-performance related metric when the measurement validity time is over.

14. The device according to claim 12, wherein the device is further configured to store the measurement of the network-performance related metric during the report validity time.

15. The device according to claim 14, wherein the device is further configured to delete the measurement of the network-performance related metric when the report validity time is over.

16. The device according to claim 1, wherein the device is further configured to receive new configuration information for carrying out the measurement; and, upon receipt of the new configuration information, replace the configuration information previously received with the new configuration information and clear the measurement of the network-performance related metric carried out consistent with the configuration information previously received.

17. The device according to claim 1, wherein the indication is transmitted to the network entity in an RRCConnectionSetupComplete message.

18. The device according to claim 1, wherein the device is further configured to receive new configuration information for carrying out the measurement; and, upon receipt of the new configuration information, replace the configuration information previously received with the new configuration information and clear the measurement of the network-performance related metric carried out consistent with the configuration information previously received.

19. A method comprising:
   receiving at a personal wireless device, configuration information for carrying out a measurement;
   carrying out, via the personal wireless device, a measurement of a network-performance related metric consistent with the configuration information, wherein the measurement is carried out when a cell or public land mobile network (PLMN) of the personal wireless device is a cell or PLMN authorized for the measurement to be performed at; and transmitting, from the personal wireless device, a result of the measurement or an indication of an availability of the measurement to a network element, wherein the result or indication is transmitted when a cell or PLMN the personal wireless device is connected to is a cell or PLMN included in a list that includes at least one reporting place authorized for reporting the measurement.

20. The method of claim 19, further comprising:
using the personal wireless device to make a telephone call.

21. The method according to claim 20, further comprising:
using the personal wireless device to communicatively couple to the Internet and perform a data-related activity.

22. The method according to claim 19, wherein the measurement is carried out when the personal wireless device is in an idle mode of operation.

23. The method according to claim 19, wherein the personal wireless device is used to further carry out the measurement in response to a first triggering event.

24. The method according to claim 19, further comprising:
transmitting a location identification request message to the network element for obtaining geographic position information of the personal wireless device prior to carrying out the measurement.

25. The method according to claim 19, wherein the configuration information comprises a measurement validity time and a report validity time.

26. The method according to claim 25, wherein the measurement of the network-performance related metric is stopped being carried out when the measurement validity time is over.

27. The method according to claim 25, further comprising storing, in the personal wireless device, the measurement of the network-performance related metric during the report validity time.

28. The method according to claim 27, further comprising deleting, in the personal wireless device, the measurement of the network-performance related metric when the report validity time is over.

29. The method according to claim 19, further comprising:
receiving, at the personal wireless device, new configuration information for carrying out the measurement; and
upon receipt of the new configuration information, replacing the configuration information previously received at the personal wireless device with the new configuration information and clearing the measurement of the network-performance related metric carried out consistent with the configuration information previously received at the personal wireless device.

30. The method according to claim 19, wherein the indication is transmitted to the network entity in an RRCConnectionSetupComplete message.

31. A non-transitory computer-readable storage medium having stored thereon computer-executable instructions comprising instructions for:
accessing measurement configuration information received in a message from a network element;
verifying that a personal wireless device is in an idle mode of operation;
carrying out, via the personal wireless device, a measurement of a network-performance related metric consistent with the configuration information, wherein the measurement is carried out when a cell or public land mobile network (PLMN) of the personal wireless device is a cell or PLMN authorized for the measurement to be performed at; and
transmitting, from the personal wireless device, a result of the measurement or an indication of an availability of the measurement to a network element, wherein the result or indication is transmitted a the cell PLMN of the personal wireless device is connected to is a cell or PLMN included in a list that includes at least one reporting place authorized for reporting the measurement.

32. The non-transitory computer-readable storage medium according to claim 31, wherein the personal wireless device is at least one of a cellular telephone, a personal digital assistant device, or an internet-enabled wireless device.

33. The non-transitory computer-readable storage medium according to claim 31, wherein the configuration information comprises a measurement validity time and a report validity time.

34. The non-transitory computer-readable storage medium according to claim 33, wherein the measurement of the network-performance related metric is stopped being carried out when the measurement validity time is over.

35. The non-transitory computer-readable storage medium according to claim 33, wherein the computer-executable instructions further comprise instructions for storing, in the personal wireless device, the measurement of the network-performance related metric during the report validity time.

36. The non-transitory computer-readable storage medium according to claim 35, wherein the computer-executable instructions further comprise instructions for deleting, in the personal wireless device, the measurement of the network-performance related metric when the report validity time is over.

37. The non-transitory computer-readable storage medium according to claim 31, wherein the computer-executable instructions further comprise instructions for:
receiving new measurement configuration information for carrying out the measurement; and
upon receipt of the new measurement configuration information, replacing the measurement configuration information previously received with the new measurement configuration information and clearing the measurement of the network-performance related metric carried out consistent with the measurement configuration information previously received.

38. The non-transitory computer-readable storage medium according to claim 31, wherein the indication is transmitted to the network entity in an RRCConnectionSetupComplete message.

39. A device configured to:
receive configuration information for carrying out a measurement, wherein the configuration information comprises a measurement validity time and a report validity time;
carry out the measurement of a network-performance related metric consistent with the configuration information, wherein the measurement is carried out when a cell or public land mobile network (PLMN) the device is connected to or located in is a cell or PLMN authorized for the measurement to be performed, and wherein the measurement is carried out until the measurement validity time is over;
store the measurement of the network-performance related metric during the report validity time;
transmit a result of the measurement or an indication of an availability of the measurement to a network element, wherein the result or indication is transmitted when the cell or PLMN the device is connected to is a cell or PLMN included in a list that includes at least one reporting places authorized for reporting the measurement; and delete the measurement of the network-performance related metric when the report validity time is over.

* * * * *